Nov. 8, 1927.
M. HOKANSON
SHOVEL HAND GRIP
Filed July 10, 1922
1,648,685
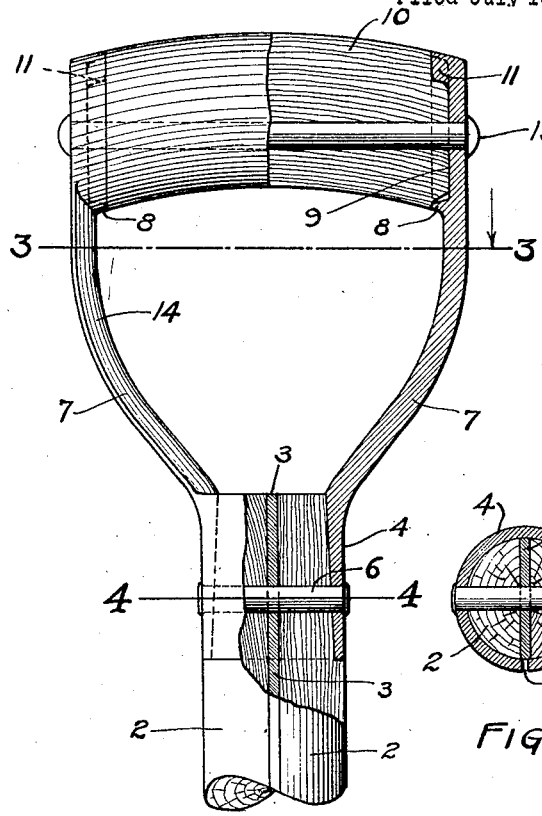
Fig. 1
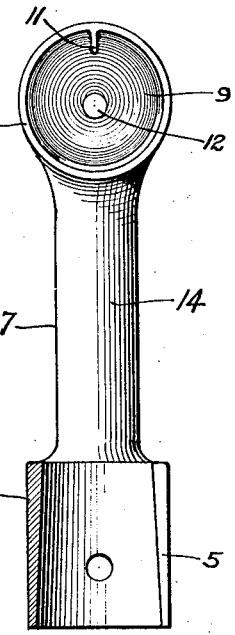
Fig. 2
Fig. 4
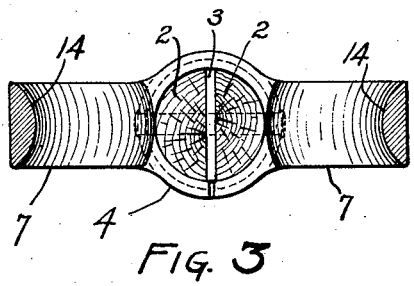
Fig. 3
Fig. 5
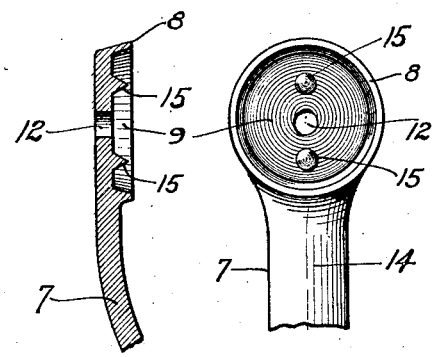
Fig. 6   Fig. 7
INVENTOR
MARTIN HOKANSON
BY
ATTORNEYS Patented Nov. 8, 1927.

1,648,685

UNITED STATES PATENT OFFICE.

MARTIN HOKANSON, OF DULUTH, MINNESOTA, ASSIGNOR TO MARSHALL-WELLS COMPANY, OF DULUTH, MINNESOTA, A CORPORATION OF NEW JERSEY.

SHOVEL HANDGRIP.

Application filed July 10, 1922. Serial No. 573,964.

The object of my invention is to provide an inexpensive hand grip for shovels and spades which can be easily grasped by the user without injury and easily assembled with other parts of the shovel, and be strong and durable.

A further object is to provide a malleable or steel forging grip having a socket into which the wooden handle can be easily and quickly fitted, with provision for tightening in case of shrinkage of the wooden handle.

Other objects of the invention will appear from the following detailed description.

The invention consists generally in various constructions and combinations, all as hereinafter described and particularly pointed out in the claims.

In the accompanying drawings forming part of this specification,

Figure 1 is a view, partially in section, of a shovel scoop spade spading fork or like hand-grip embodying my invention, Figure 2 is a sectional view through the socket of the grip, showing the seat into which one end of the wooden portion of the grip is inserted.

Figure 3 is a sectional view on the line 3—3 of Figure 1,

Figure 4 is a sectional view on the line 4—4 of Figure 1,

Figure 5 is a detail view showing the preferred manner of forming the wooden grip, Figures 6 and 7 are detail views of a slightly modified construction.

In the drawing, 2 represents the wooden handle portion of the shovel, made of two longitudinally divided sections having a metallic reinforcing plate 3 between them. 4 is the cylindrical socket of the hand grip into which the tapered end of the wooden handle is inserted. This socket and the arms of the hand grip are preferably made of malleable metal or forged steel and, as indicated, the socket is cut open at the back, as shown at 5 in Figure 4, to allow sufficient spring of the metal to permit the wooden handle to be driven into the tapered socket and fitted therein, the taper of the socket being formed preferably by the decreasing thickness of the walls thereof from the inner toward the outer end. In case of shrinkage of the wooden handle, the gap 5 allows the socket to be tightened thereon merely by upsetting the ends of the rivet 6. Thus the hand grip can be easily and quickly tightened on the handle whenever occasion requires.

7 represents the diverging arms of the hand grip formed integrally with the socket 4 and having their outer portions in parallel relation and provided with annular flanges 8 forming cups 9 to receive the wooden grip 10. Webs or fins are preferably formed in the flanges 8 projecting into the cups to enter the ends of the wood grip and prevent it from turning. The rivet holes 12 are eccentrically placed in the arms 7 and when the pin or rivet 13 is inserted therein and headed, it will be impossible to turn the grip even though the webs or fins 11 are omitted.

It will be noted that the wooden grip is curved from end to end so that it will be stronger and more comfortably fit the hand of the user and this curvature is obtained by steaming the wood or by any other suitable process after it has been split and turned down to the desired diameter in the direction of the grain and when so curved, the ends are cut off and recessed to fit the cups in the ends of the hand grip arms, the outer ends of the arms being separated to allow the convenient insertion of the grip between them. Then when the rivet is tightened, the wood grip will be securely held. With the grip made in this way there will be no cross grain sections to split off and damage the handle or render the shovel unfit for use.

By first turning down the wood to the desired size, before bending it, the grain is made to run throughout the length of the grip and it may be cut for any desired length and easily and quickly fitted to the sockets or cups in the arms.

As shown in Figure 3, the arms have curved inner surfaces 14, the outer surfaces being substantially flat. This construction will provide maximum strength and at the same time the curved inner surfaces of the arms will eliminate all sharp corners or edges which might injure the hand of the user. This form of arm also requires the minimum amount of material.

In Figures 6 and 7 I have shown a slightly modified construction which consists in providing inwardly projecting points 15 in the bottom of the cups 9, said points being adapted to dig into the ends of the wooden grip and hold it securely against turning, and I may also, in this construction, insert the rivet through the grip eccentrically thereto, as described with reference to Figure 1, or this eccentric arrangement of the rivet may be omitted when the points are used.

I claim as my invention:

1. A tool hand grip comprising a malleable or forged steel shank having a socket externally cylindrical and internally tapered to receive the correspondingly tapered end of a wooden handle, the walls of said shank being divided longitudinally to permit spring of the metal and formation of a gap at the divided point of the shank and the insertion of the wooden handle therein with a driving fit said handle being composed of longitudinally divided sections, a metallic reinforcing plate fitting between said sections and extending through said socket, a rivet passing through said shank and handle and said reinforcing plate and securing them together and closing said gap as the wood shrinks and the rivet is tightened, said shank having integral arms extending therefrom, and a wooden hand grip secured between the outer ends of said arms.

2. A handle comprising a malleable shank formd to receive the tapered end of a tool handle and divided longitudinally to allow spring of the metal and the insertion of the handle with a driving fit, arms formed integrally with said shank and decreasing in thickness from the center toward each edge and having substantially flat outer surfaces and smooth convexed inner surfaces for contact with the hand of the user and cup-shaped outer ends, a curved wooden hand grip interposed between the outer ends of said arms with the grains of the wood running parallel with the general curve of the grip and a rivet passing through said arms and lengthwise through said grip, concentrically with said cup-shaped portions but eccentrically to the main body portion of the hand grip.

In witness whereof, I have hereunto set my hand this 28th day of June, 1922.

MARTIN HOKANSON.